(12) United States Patent
Swenton-Wall et al.

(10) Patent No.: US 6,590,586 B1
(45) Date of Patent: Jul. 8, 2003

(54) USER INTERFACE FOR A BROWSER BASED IMAGE STORAGE AND PROCESSING SYSTEM

(75) Inventors: Patricia L. Swenton-Wall, Victor, NY (US); Andrea Mosher, Penfield, NY (US); Susan L. Stewart, Pittsford, NY (US); Francoise Brun-Cottan, Pittsford, NY (US); David L. Lindahl, Jr., Rochester, NY (US); Nelson G. Mejias-Diaz, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/428,826

(22) Filed: Oct. 28, 1999

(51) Int. Cl.⁷ .................................................. G09G 5/00
(52) U.S. Cl. ....................................... 345/730; 345/738
(58) Field of Search ................................. 345/730, 731, 345/732, 838, 738, 748, 428, 700; 709/203, 218; 707/3, 104.1, 10, 102

(56) References Cited

U.S. PATENT DOCUMENTS 5,557,728 A  *  9/1996  Garrett et al. .............. 345/801
5,579,471 A  * 11/1996  Barber et al. ............... 345/700
5,794,216 A  *  8/1998  Brown ......................... 705/27
5,983,218 A  * 11/1999  Syeda-Mahmood ............ 707/3
6,092,080 A  *  7/2000  Gustman .................... 707/102
6,175,423 B1 *  1/2001  Frickey ....................... 358/1.2
6,237,010 B1 *  5/2001  Hui et al. .................... 345/428
6,301,586 B1 * 10/2001  Yang et al. ................... 705/27
6,396,500 B1 *  5/2002  Qureshi et al. .............. 345/473

OTHER PUBLICATIONS

Allan Kuchinsky et al., "FotoFile: A Consumer Multimedia Organization and Retrieval System," CHI '99, May 15–20, 1999.*

* cited by examiner

Primary Examiner—John Cabeca
Assistant Examiner—Tadesse Hailu
(74) Attorney, Agent, or Firm—Kent Chen

(57) ABSTRACT

A simplified user interface for an image database management system is described. The interface provides a menu driven system for generating a search query. A remote server generates a result containing images that satisfy the search parameters in the query. The interface then displays the images in the result as simulated slides. A user organizes the simulated slides for a presentation by manipulating the simulated slides. The slides may be manipulated on a simulated light table or by placing the slides in a simulated slide carousel. The slides may be freely transferred among the light table, slide sleeve, and slide carousel. Handling images as simulated slides on equipment familiar to the user substantially reduces the time needed to learn how to use the user interface.

9 Claims, 11 Drawing Sheets

USER INTERFACE FOR A BROWSER BASED IMAGE STORAGE AND PROCESSING SYSTEM

BACKGROUND

The present invention relates to data retrieval and display, and more particularly to an intuitive system which represents the data as simulated slide photographs with attributes of same.

As the price of electronic memory storage systems drop, many images formerly stored on paper have been converted into electronic files and stored in electronic databases. The databases typically include image management software that allows a user to organize and access the images.

Users interact with the image management software through a user interface. An input device, such as a keyboard or mouse, facilitates interaction with the user interface. Using the input device, the user inputs information that allows the image management software to select images from the database.

One problem with current user interfaces is user difficulty in mastering the commands for interface use. Before inputting information to initiate a search, users typically must first read detailed instructions. This is due primarily to the non-intuitive nature of most current user interfaces for image data search and processing. After the search result is returned by the computer system, manipulation of the search result for export to other programs or for designing a presentation is also not intuitive.

Although intuitiveness of interfaces may not be critical where users are very familiar with the computer system and associated software, these search interfaces are inappropriate for environments in which occasional or casual users regularly access the system. A public library is one example of such an environment General public access to these image database systems results in the expenditure of substantial library resources to assist library patrons in performing image searches and manipulating the results of the search.

Thus, an improved interface that simplifies the input of information used to initiate a search and simplifies the manipulation of search results is needed.

BRIEF SUMMARY OF THE INVENTION

In order to reduce the learning time for user interfaces for searching an image database and for manipulating retrieved images, the present invention simplifies the query process that initiates a search and allows the results of a search to be handled using techniques typically used to handle photographic materials, such as 35 millimeter (mm) slides or the like.

In one embodiment of the invention, a user inputs a query by choosing search parameters from a pre-selected group of search parameters displayed on the screen. Each chosen search parameters allows the user to add search criteria that limits the scope of the search parameter defining the search. After the user inputs and transmits the query, a remote computer returns a search result consisting of images that satisfy search parameters in the query. Each image in the search result is displayed as a simulated photographic slide. The slides are displayed in a simulated slide sleeve. The user interface allows simulated slides to be removed from the simulated slide sleeve and sorted or rearranged on a simulated light table.

When preparing a presentation, a "digital carousel" that simulates operation of a photographic slide projector carousel is used. The digital carousel facilitates sequencing of images for presentation by reordering slides according to a list that is manipulated by the user to create a user defined sequence. The digital carousel later displays the images in the user defined sequence. When a presentation compares two or more images, two or more digital carousels may be used to simultaneously display images allowing the comparison of two user or more defined sequences of images.

Most users are familiar with techniques used to handle photographic slides. Thus, allowing users to handle the results of a image database search using techniques that are typically used to handle photographic slides substantially reduces the learning time for using the interface to the image database system.

BRIEF DESCRIPTION OF THE FIGURES

A more complete appreciation of the invention and many of the attendant advantages thereof will be readily obtained and understood by referring to the following detailed description and the accompanying drawings in which like reference numerals denote like elements as between the various drawings.

FIGS. 3A shows a simulated slide sleeve containing simulated slides of retrieved images while

DETAILED DESCRIPTION

Figure 1:
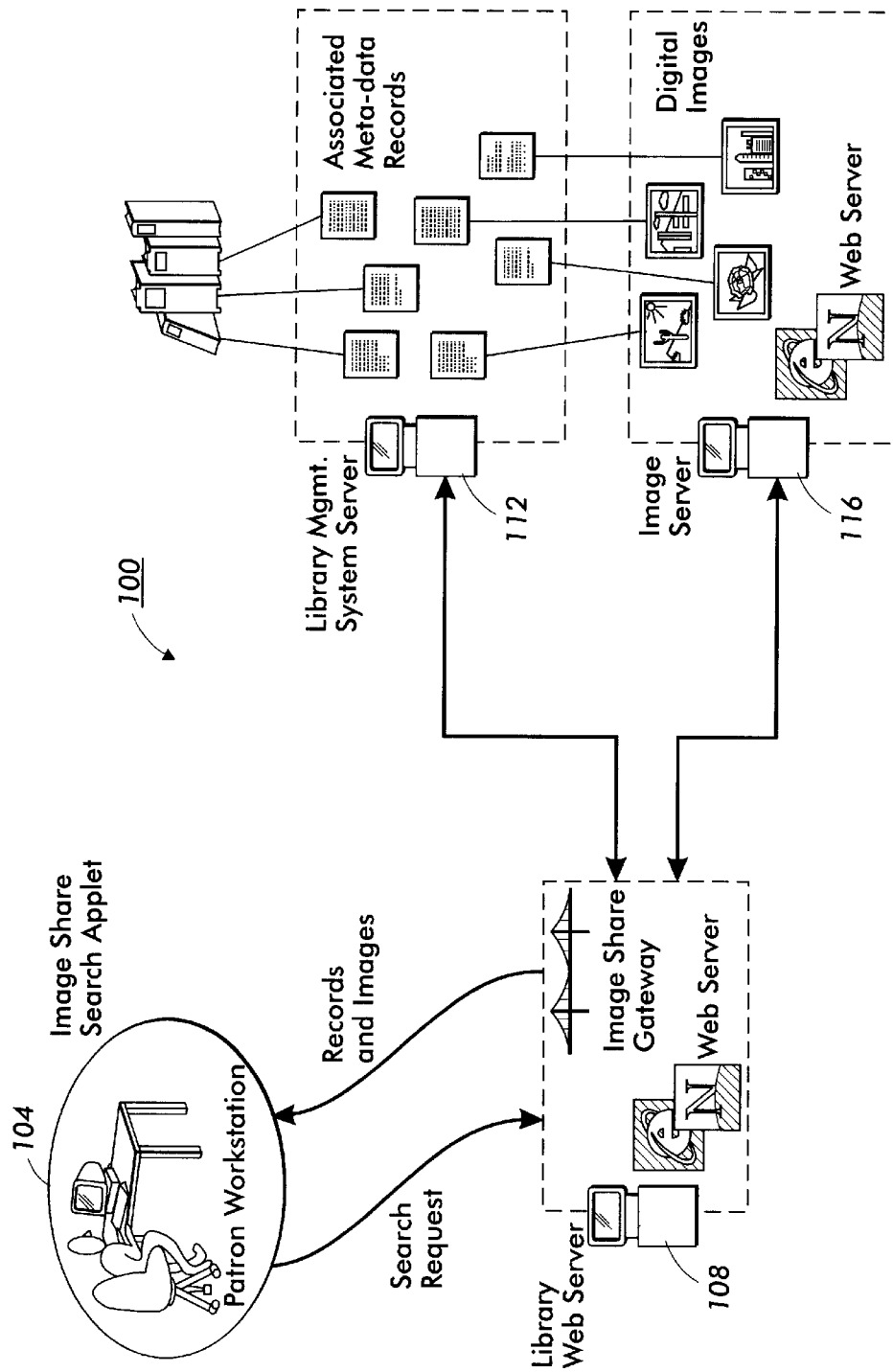
FIG. 1 shows an architectural overview of a system to store and retrieve images in one embodiment of the invention.

FIG. 1 shows an architectural overview of a system 100 used to store and retrieve images. As used herein, the term "image" is not limited to "pictures" but may include any arbitrary representation of data, including graphic and/or textual data. In FIG. 1, a user enters a query on a processing system such as workstation 104. The query specifies search parameters and is entered into a query interface. (One example of a query interface for receiving search parameters is described below with reference to FIG. 2) When used in a network environment, one method of implementing the query interface is in a browser, preferably a Java compliant browser such as Navigator from Netscape Corp. or Explorer from Microsoft Corp.

In FIG. 1, library web server 108 serves as a gateway to access library management server 112 and image server 116. Initially, library web server 108 maintains a first Java program (a search applet) and a second Java program (a gateway). The gateway serves as an intermediary between the search applet that is downloaded to workstation 104 and servers 112, 116.

When a user begins a session at workstation 104, library web server 108 transfers the search applet to workstation 104. Workstation 104 runs the search applet in a web browser. To minimize damage from viruses, the web browser places several restrictions on downloaded Java programs such as the search applet. One of these restrictions allows the search applet to initiate network connections only to the server that transmitted the Java program (library web server 108). Because the search applet cannot initiate network connections to other networked computers, the search applet running on workstation 104 cannot initiate network connections to library management server 112 or image server 116.

Unlike the search applet, the gateway executing in library web server 108 is an installed Java program. An installed Java program is less restricted and may execute instructions that initiate network connections to a variety of computers. Thus, the gateway executing in library web server 108 is able to initiate connections to both library management server 112 and image server 116. The gateway acts as an intermediary that transfers information between the search applet running in a browser on workstation 104 and software running in library management server 112 and image server 116.

After receiving a search query, library web server 108 forwards the query to library management server 112. In one embodiment of the invention, a communication protocol such as ANSI/NISO Z39.50-1995 is used to communicate data between library management server 112 and library web server 108. Library management system server 112 stores a plurality of meta-data records. Each meta-data record includes text data associated with a corresponding digital image. Examples of data that may be included in a meta-data record include the title, the author, the subject, and a description of the corresponding digital image. The corresponding digital image is stored in image server 116.

When a query is received from library web server 108, library management server 112 searches the meta-data records for corresponding information. A "result" is returned when the search is completed. The result includes all meta-data records that satisfy the search criteria. Image server 116 also retrieves and transmits digital images that correspond to the meta-data records in the result. Library web sever 108 receives both the meta-data records and the corresponding digital images in the result and formats the result for display on the browser in workstation 104. Although in FIG. 1, library management server 112 and image server 116 are shown as two different servers, in an alternate embodiment the functions of image server 116 and library management server 112 may be combined into a single computer. Also, in alternate embodiments, library web server 108 may be coupled to many servers across a network, each server across the network providing images or meta-data records to library server 108.

Figure 2A:
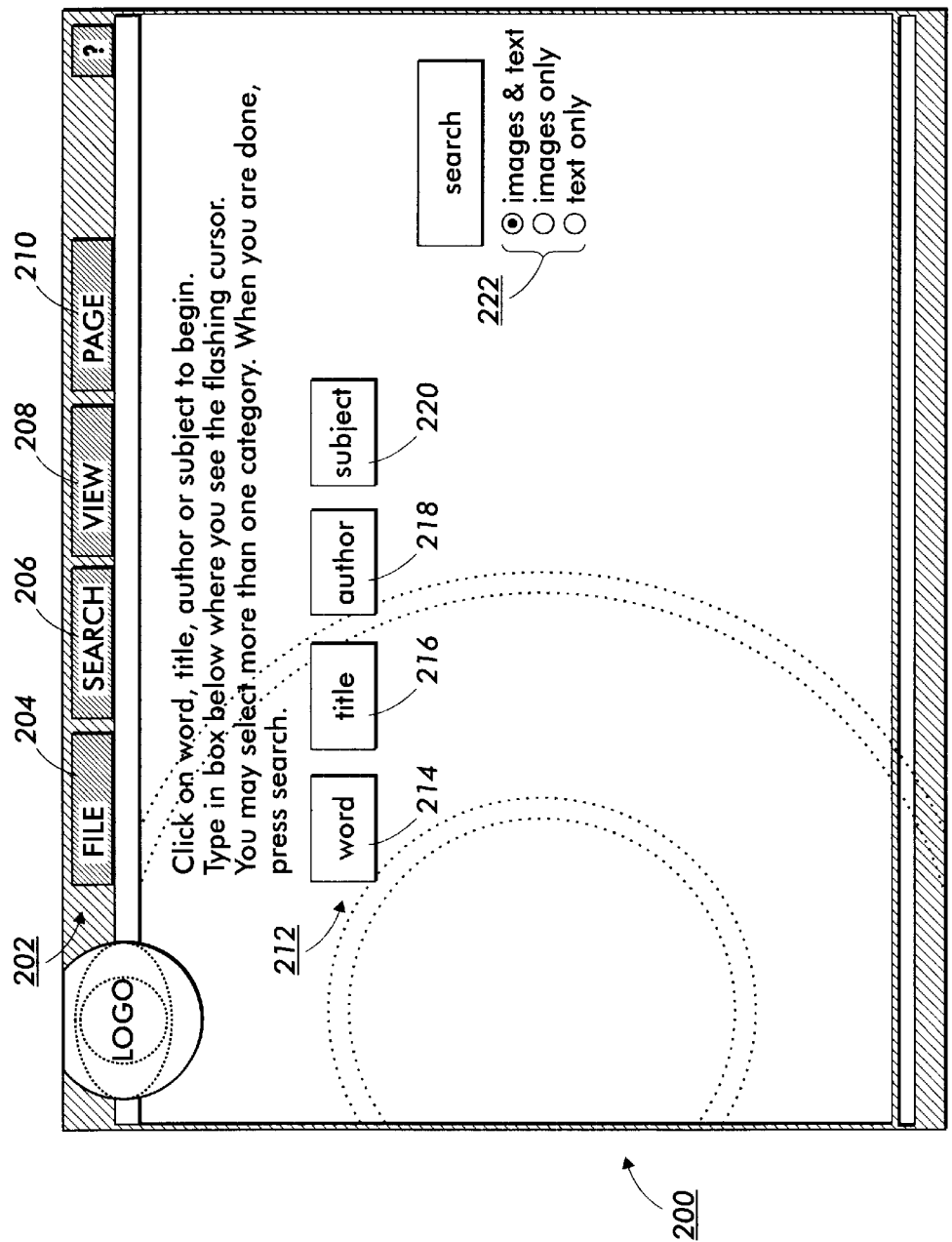
FIGS. 2A, 2B and 2C show a query interface for setting parameters used to search a database of images.
Figure 2B:
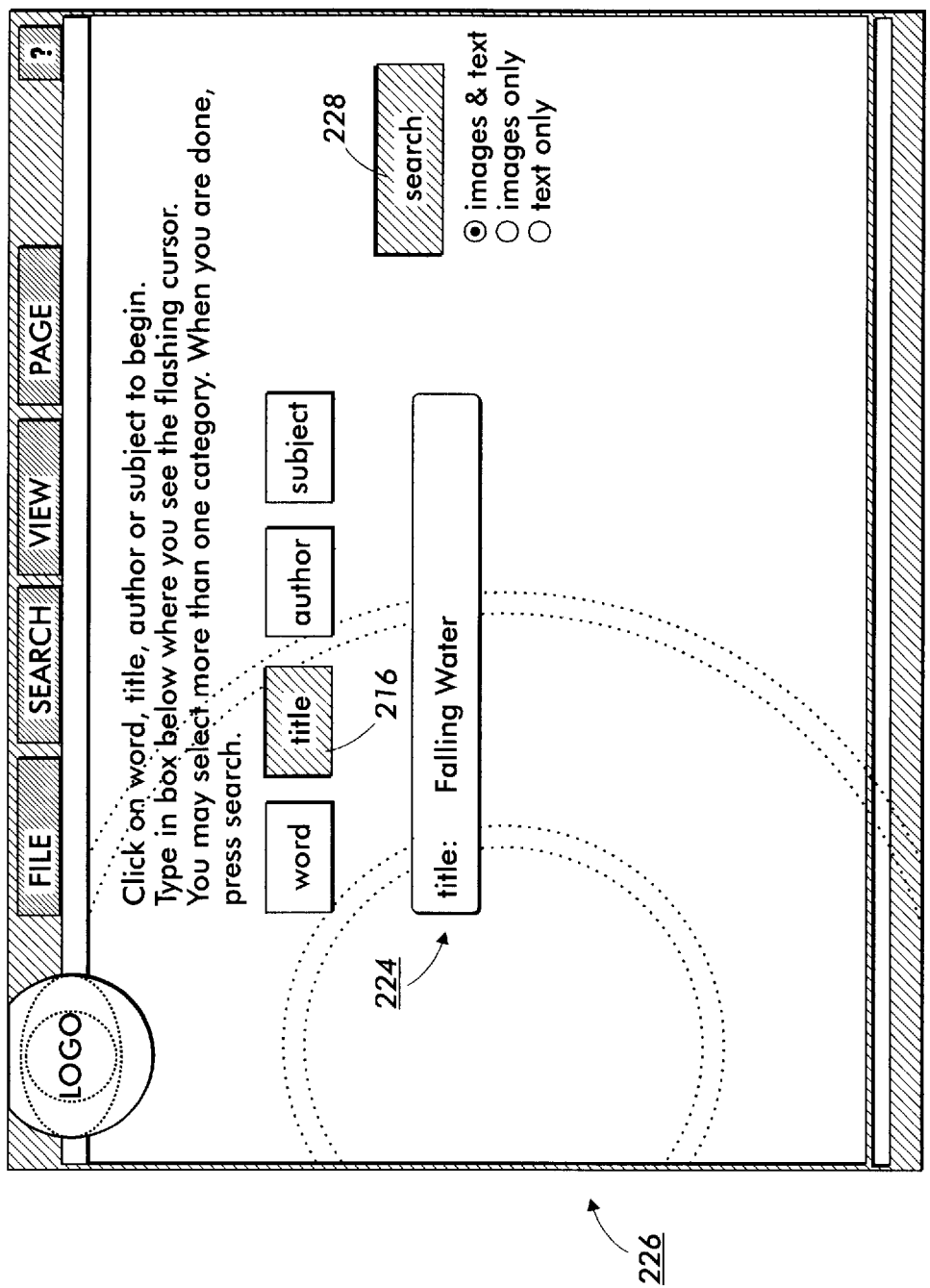
Figure 2C:
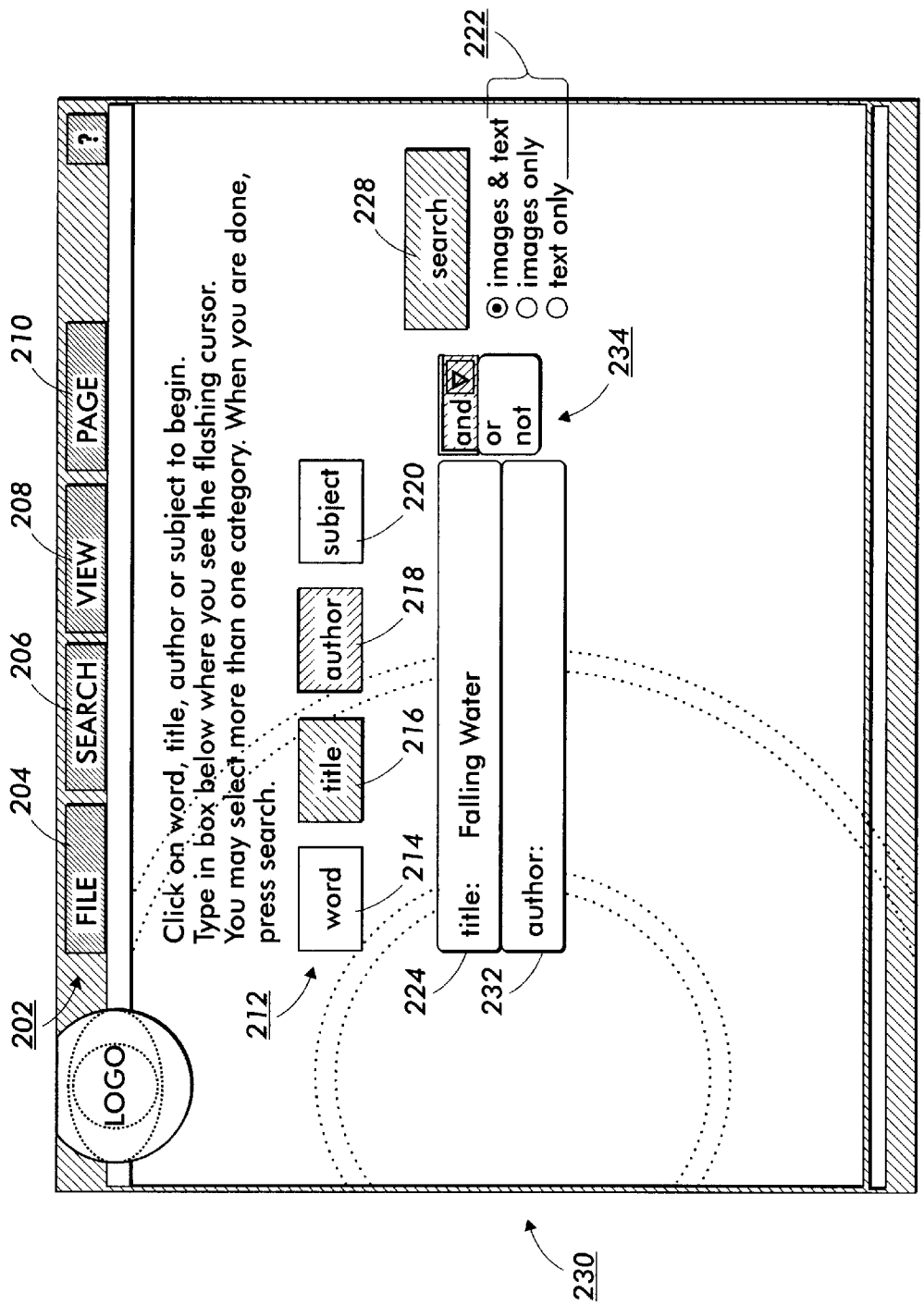

In order to generate a query, the user first enters the queried data into an input interface or search screen. A typical search screen and appropriate search screen transitions are illustrated in FIGS. 2A, 2B and 2C. FIG. 2A shows an initial search screen 200 that appears after a standard welcome screen. FIG. 2C illustrates the elements of FIG. 2A as well as additional elements that are acquired as the query is generated. The initial search screen 200 includes a plurality of drop down menus 202 entitled FILES 204, SEARCH 206, VIEW 208, and PAGE 210 shown in detail in FIG. 2C. When a search is to be conducted, search parameter buttons 212 are provided. Selecting a search parameter button allows the input of a corresponding search parameter. In the illustrated example, each search parameter corresponds to a field of data in each record of meta-data stored in library management server 112. The illustrated search parameter buttons include word 214, title 216, author 218, and subject 220. Alternate embodiments may include different, or additional search parameter buttons. A user can additionally specify whether only the image based documents (such as images with describing meta-data) or text based documents (such as technical papers or books) are to be searched, or whether both the images based documents and text based documents are to be searched. Selecting the appropriate search delimiter in delimiter boxes 222 defines whether image or text based documents are searched.

When a particular search parameter button 212 is selected, such as the title 216 search parameter button, a title input box 224 appears as illustrated in intermediate screen 226 of FIG. 2B. A user can input the entire title or selected words from the title. When the user selects search button 228 after entering the title, workstation 104 of FIG. 1 transmits the query to the library web server 108.

In some queries, a single search parameter may produce too many matches and thus an inconveniently large result. Selecting a second search parameter button 212 identifies a second search parameter or a second field to be searched.

FIG. 2C shows a third input screen 230 that illustrates an extended input box 232. The extended input box 232, including areas for the input of author information, results when the author search parameter button 218 is selected. In order to define a search query that utilizes more than one search parameter, boolean function box 234 allows selection of a link. The link defines the relationship between the multiple search parameters. In the illustrated embodiment of FIG. 2C, the two search parameters "title" and "author" may be connected using the links "and", "or", or "not". Use of the boolean function "and" requires that each meta-data record retrieved in a search result satisfy both search parameters, "or" requires that each meta-data record satisfy at least one search parameter, and "not" requires that each meta-data record retrieved satisfy one search parameter and not satisfy a second search parameter. These logic functions may be further extended to cover additional search parameters for added flexibility. However adding additional search parameters increases the complexity of the system to the novice user.

After input of the search request and initiation of a search by selecting search button 228, the browser transmits the query to external or remote computers such as library management system server 112 and image server 116. The remote computers return a result that includes images and meta-data records that satisfy the query. The result is returned to the browser on workstation 104.

Figure 3A:
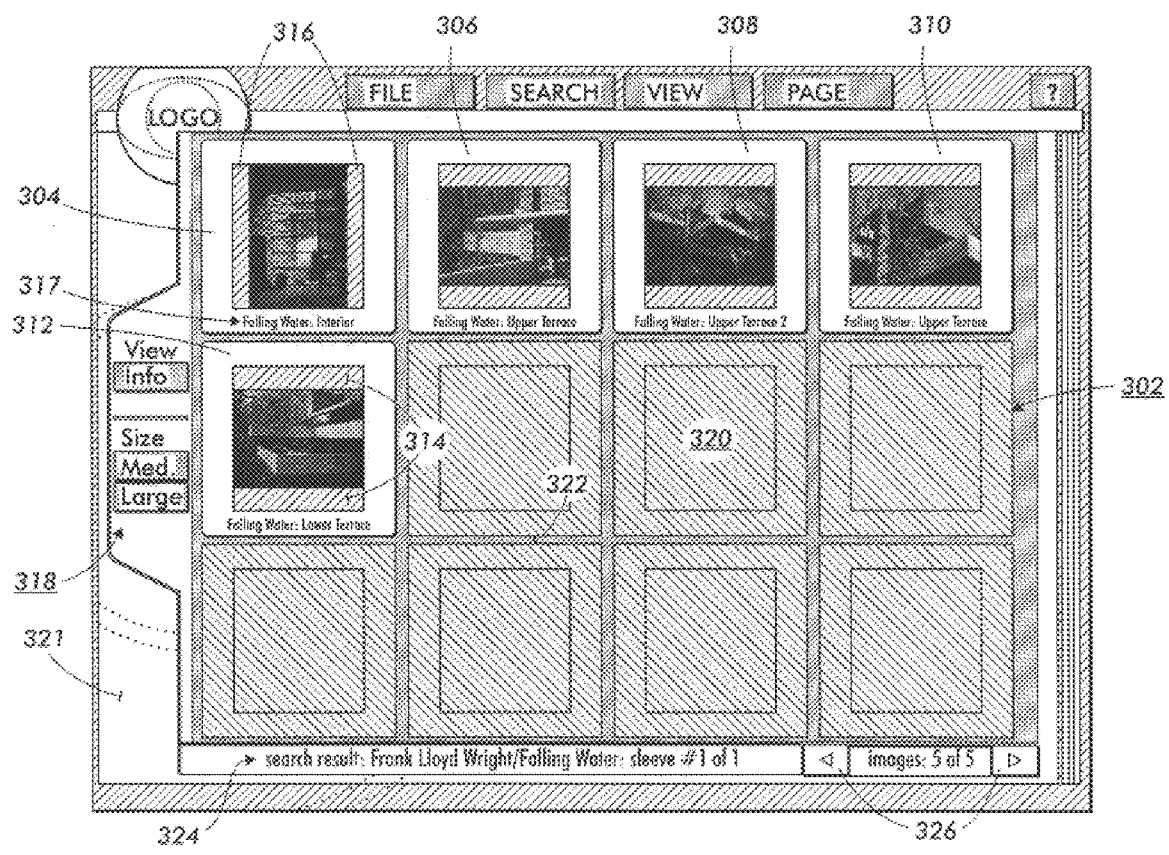
Figure 3B:
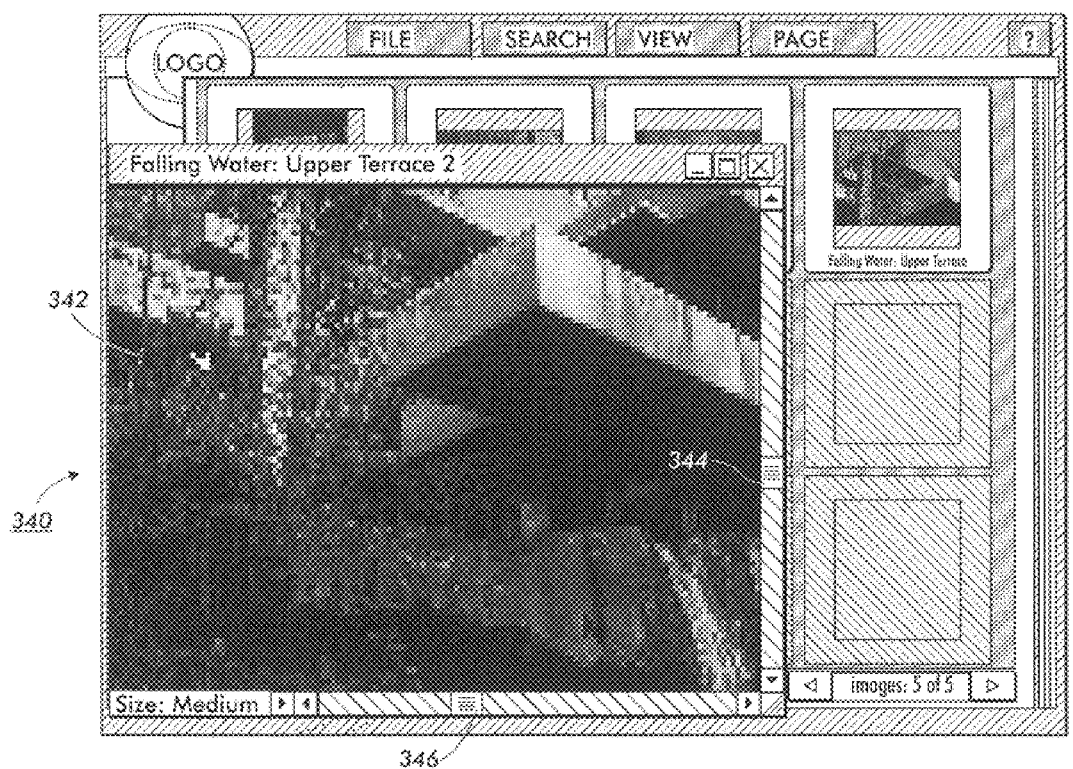
FIG. 3B shows an enlarged image selected from the slide sleeve.

FIGS. 3A, 3B and 3C show how the result may be displayed. In FIG. 3A, the result is displayed to the user in a series of uniform sized miniaturized or "thumbnail" images 304, 306, 308, 310, 312 in a slide sleeve 302. A standard frame, such as frame 312, surrounds each thumbnail image. The combination of image and frame simulates a photographic slide.

The size of each image and frame is standardized to a common size. The aspect ratio of each image matches the aspect ratio of a standard 35 mm photographic slide. Likewise, the frames surrounding each image are also sized to simulate the dimensions of a standard 35 mm photographic slide. Unusual sized images may not have the correct dimensions or aspect ratio for a slide image. In such cases, bordering regions, or black "shadow bars" may be used along the sides of the image. For example, elongated thumbnail image may be either vertically or horizontally oriented. Image 312 illustrates a landscape (horizontal)

orientation with horizontal shadow bars 314 running across a top and bottom. Image 304 illustrates a portrait (vertically) oriented image with horizontal shadow bars 316 on a left and right side. Text describing the image, such as text 317, may be included on the frame.

A simulated slide sleeve 302 (hereinafter "slide sleeve") contains the simulated slides of the result. Slide sleeve 302 simulates a photographic (e.g., 35 mm) slide sleeve of a photo album. A left portion of slide sleeve 302 includes selectable viewing options 318. The setting of the viewing options determines whether associated text data is displayed and the size of an image to be displayed. Slide sleeve border 322 outlines the boundaries between slides as well as unfilled elements 320. Unfilled elements are elements in the slide sleeve that do not contain an image simulating a slide. Unfilled elements are sized to accommodate additional simulated slides that may be received. In one embodiment of the invention, the slide sleeve is displayed as if it were arranged on a simulated light table 321. That is, displayed as if it were on a surface having a backlight and light diffuser to facilitate viewing the image without the need for projecting that image. Thus, the display simulates light passage through the images and around the perimeter of simulated slide sleeve 302.

In FIG. 3A, slide sleeve 302 is configured to contain twelve images. When a search result includes more than twelve images, additional slide sleeves associated with the additional images are layered underneath the displayed slide sleeve 302. A page information caption area 324 displays the total number of slide sleeves as well as the sleeve number of the current displayed slide sleeve. A page button 326 allows the user to move forwards and backwards through the layers of slide sleeves (e.g., such as if a user were turning the pages of a photograph album containing slides in sleeves).

When a larger view of a particular slide is needed, the slide is selected. Typically selection occurs by moving a pointer or cursor over the slide to be viewed and activating a switch (such as pressing a button on a mouse). The selection may be highlighted using a number of techniques. One method of highlighting the selection alters the color of the frame surrounding the selected image. Display of the selected image may be changed by selection of option settings. In particular, the option setting chosen from selectable viewing options 318 determine how the selected image will be displayed (whether in a large or medium format and also whether associated meta-data will be displayed).

Screen 340 of FIG. 3B illustrates the appearance of the display screen when "medium" is selected from viewing options 318. In screen 340, an enlarged image 342 of the selected image 308 is displayed. When "large" size is selected from viewing options 318, the image 342 is further enlarged. Scroll bars 344, 346 on either side of enlarged image 342 allows viewing of different parts of enlarged image 342.

Figure 4:
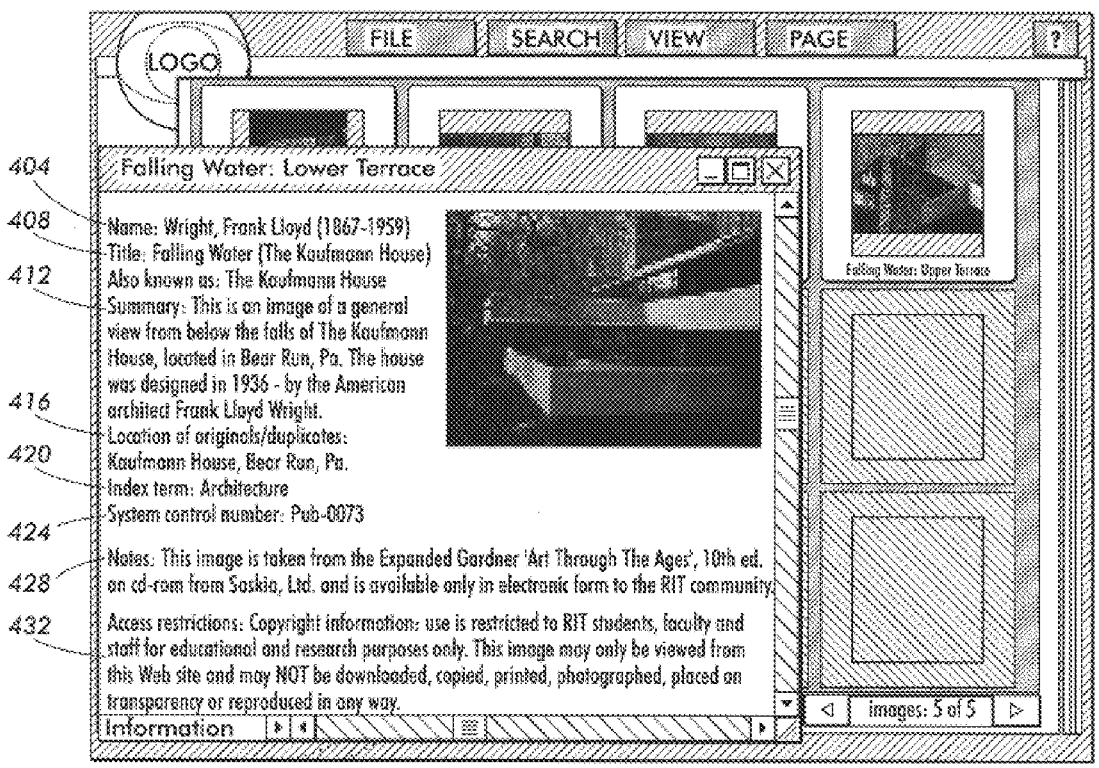
FIG. 4 shows a window that includes various fields of meta-data

FIG. 4 illustrates different fields of meta-data that may be displayed when the "info" button is selected from viewing option 318 of FIG. 3. In FIG. 4, illustrated fields include the author of the image 404, the image title 408, the image summary 412, the location of the original work 416, the index file name 420, the library card number 424, image notes 428, and copyright information 432. The foregoing list is only an example of possible fields. Other fields may be appropriate depending on the type of work displayed. For example, photographs may include fields containing camera information, aperture settings, and lens focal lengths.

Figure 5A:
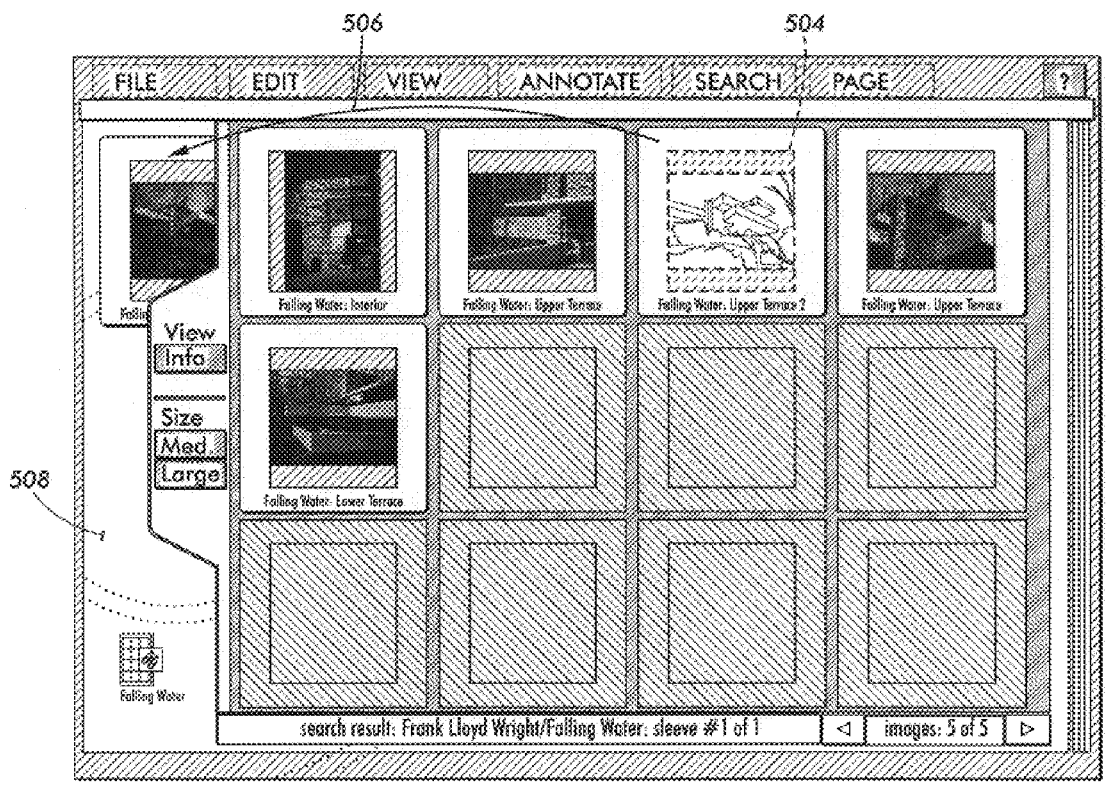
FIG. 5A shows removal of a slide from the slide sleeve.

After the results of a search have been produced and displayed as slides in a slide sleeve, the graphical user interface of the present invention allows the user to manipulate the slides. FIG. 5A illustrates one method of reorganizing digital images on a virtual light table. As previously discussed, slides in the simulated slide sleeve can be selected. Once selected, the image of the slide may be viewed in different sizes with different associated information. Alternately, a selected image 504 may be moved as indicated by arrow 506 and deposited onto a light table (background) 508 where the selected image can be sorted and/or organized. A "grayed" or shadowed image icon remains in the sleeve to indicate that the image was copied to the light table.

Figure 5B:
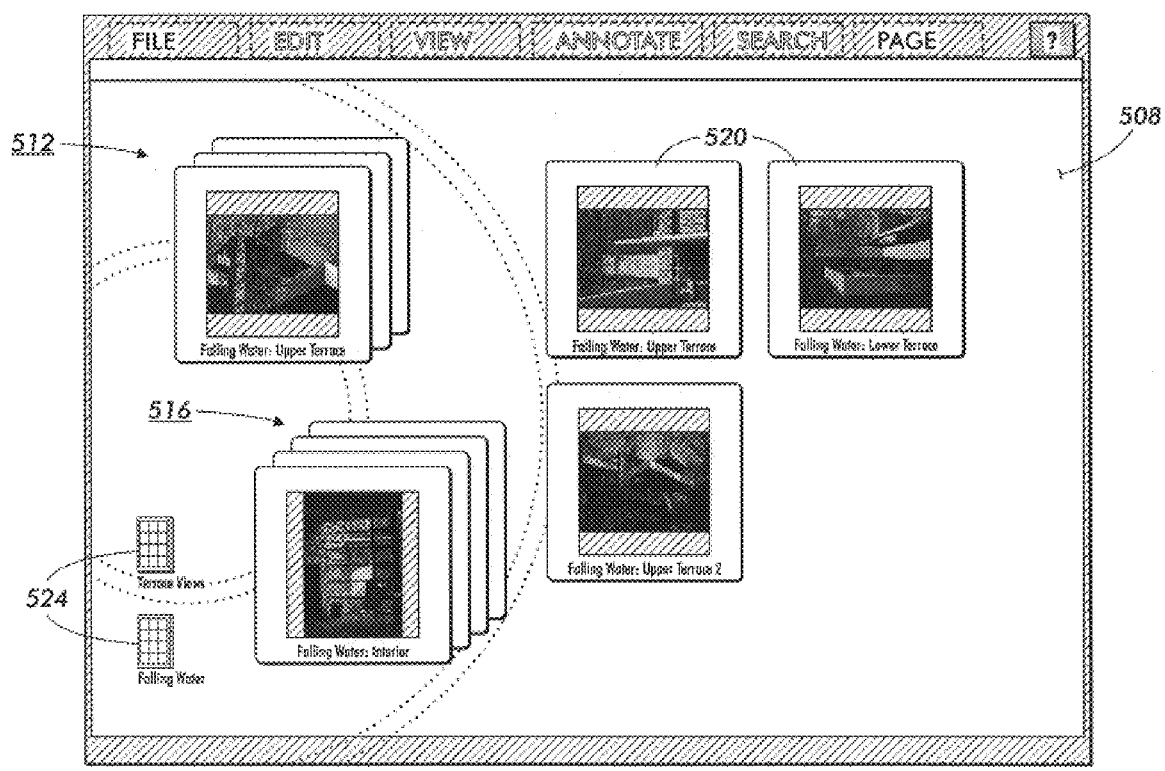
FIG. 5B shows a simulated light table and one system of grouping slides on the simulated light table.

Images copied to light table 508 may be rearranged or organized. For example, related "slides" may be organized into stacks 512, 516 as illustrated in FIG. 5B. Individual slides 520 may remain ungrouped for repositioning in subsequent groupings. Slide sleeve icons 524 allow users to retrieve the full slide sleeve. Retrieval of the full slide sleeve allows slides or groups of slides to be inserted into the slide sleeve as well as allowing selected additional slides from the search result to be removed from the slide sleeve.

Figure 6A:
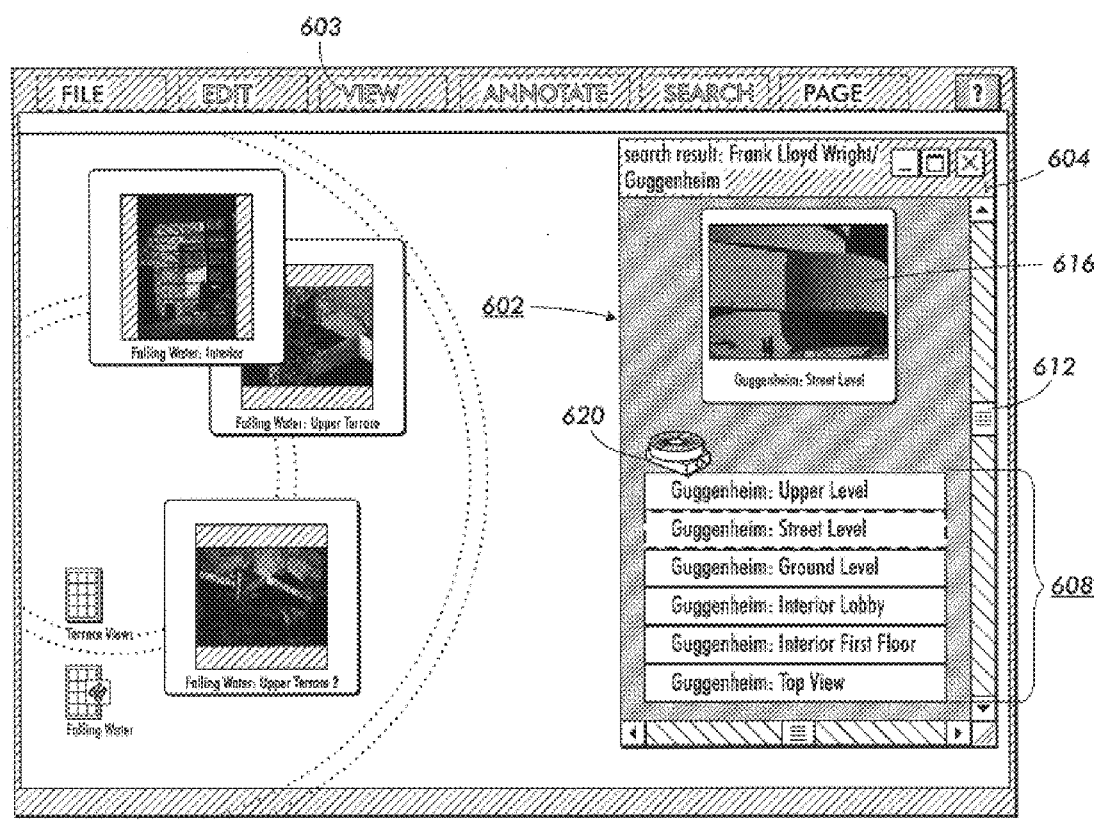
FIGS. 6A and 6B show a simulated carousel used to arrange and sequence a series of simulated slides.
Figure 6B:
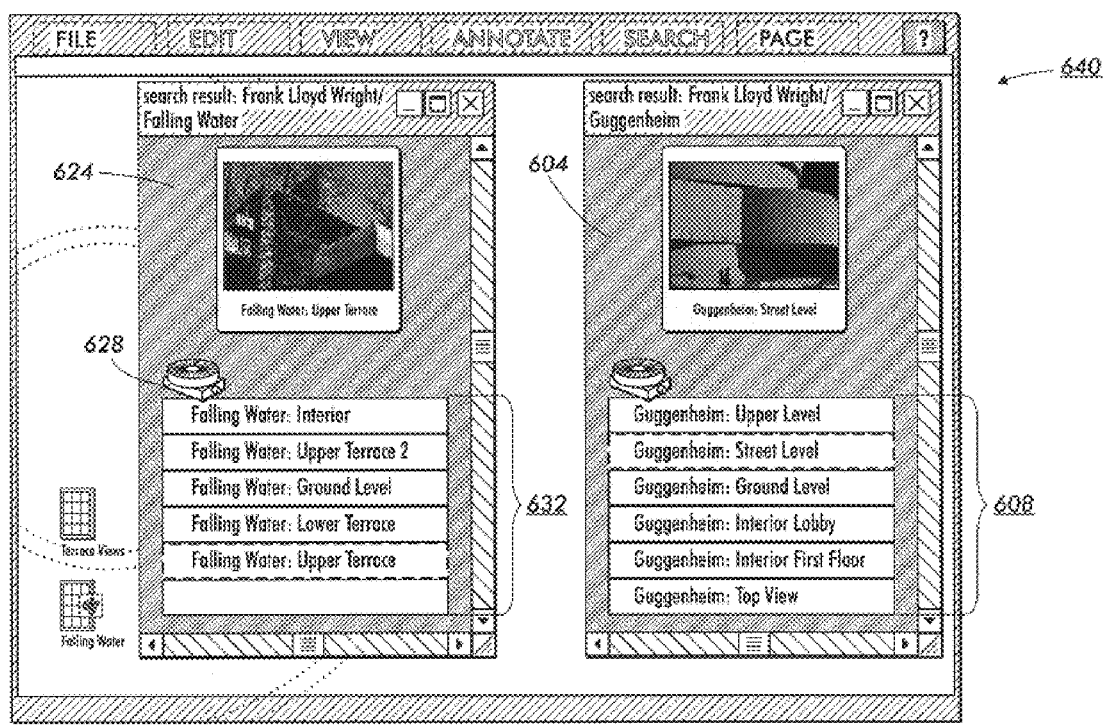

FIG. 6A illustrates a convenient method of organizing the slides for a presentation in a "carousel" configuration. A carousel configuration simulates the output of a photographic slide projector carousel in that a series of images are organized and displayed in a predetermined sequence dictated by the ordering of images in the carousel. In carousel 604 of FIG. 6A, a list 608 of titles appears below an image. The order of the tides indicates the ordering of the images. When a user selects a tide in list 608, a reduced image 616 corresponding to the tide is displayed. A pointing device such as a mouse may be used to insert, delete, or reorganize tides or groups of titles in the list 608. Rearrangement of the titles results in a corresponding rearrangement of the images in the carousel. In one embodiment of the invention, the images in the carousel can be moved to and from a slide sleeve without disturbing the ordering of slides. Thus ordering can be done either in the carousel or in the slide sleeve.

A carousel window 602 displays the contents of carousel 604. While carousel window 602 is displayed, other windows that provide associated meta-data or larger selected images may be displayed in other windows by selecting options from the VIEW drop-down menu 603. Carousel window 602 includes scroll bars 612 on a side and bottom of the window perimeter. A miniature or "thumbnail" of an image 616 corresponding to a title selected from list 608 appears at the top of the carousel window. Carousel icon 620 allows a user to handle all slides in list 608 as a group. The shape and form of carousel icon 620 depicts a traditional photographic slide carousel used in slide projectors. In one embodiment of the invention, labels may be associated and displayed with each carousel to differentiate between carousels.

One use of slide presentations is to compare and contrast two or more images. To facilitate such comparisons, a second simulated carousel 624 corresponding to a second carousel icon 628 may be displayed adjacent to carousel 604 as shown in screen 640. Placement of the two carousels 604, 624 side by side allows a viewer to compare and contrast two images. The placement also allows comparison of first list 608 with second list 632 to determine which slide from carousel 604 will appear matched with a slide in carousel 624. Although the prior description focuses on the simultaneous display of two images using two carousels, the invention may be generalized to describe n carousels used to display n simultaneous images where n is an integer larger than one.

After the slides have been organized into a final output form, such as a properly ordered carousel of images, the user selects a proper format for the data The form of the data may be as a direct presentation from workstation 104 to a monitor. Alternately, the data may be reformatted for export to other display or printing systems. For example, one method of output is to export the data to a third party software application such as Power Point from Microsoft Corp. of Redmond Wash. Prior to the exportation of data, workstation 104 formats the images into a file that matches a predefined format for input into the third party software application.

While certain exemplary embodiments of the invention have been described in detail above, it should be recognized that other forms, alternatives, modifications, versions and variations of the invention are equally operative and would be apparent to those skilled in the art. For example, slide layout, protocols for transferring information, and types of images displayed may be easily altered. Accordingly, the present invention should not be limited by the embodiments used to exemplify it, but rather should be considered to be within the spirit and scope of the following claims, and equivalents thereto, including all such alternatives, modifications and variations.

What is claimed is:

1. A method of manipulating query results comprising the operations of:

transmitting from a browser a query to search an image database collection;

receiving a result of the search and displaying a plurality of images in the result as simulated slides in a simulated slide sleeve, the simulated slide sleeve including an outline of a vacant area to accommodate additional simulated slides, the simulated slides including a picture region, and a corresponding frame surrounding each picture region to simulate the appearance of a 35 mm slide;

moving at least one simulated slide from the simulated slide sleeve to a simulated light table, the at least one simulated slide to be combined with other simulated slides in a group;

providing for user-defined sequencing of the simulated slides, the user-defined sequencing including the operations of loading the simulated slides into a simulated carousel, the simulated carousel including an icon to simulate a 35 mm slide projector and a window to display the contents of slides loaded into the simulated carousel; and, processing the group of simulated slides in the order in which said simulated slides are loaded into said simulated carousel.

2. The method of claim 1, wherein said processing operation is displaying each slide.

3. The method of claim 1, wherein said processing operation is exporting the contents of the simulated carousel to a presentation program.

4. The method of claim 1 further comprising the operations of:

removing the simulated slides from the simulated slide sleeve and creating a title list, each title in the title list corresponding to a simulated slide, the ordering of titles in the title list to indicate the order of display in a slide presentation.

5. The method of claim 1 wherein the simulated slides have an aspect ratio to match 35 millimeter slides.

6. The method of claim 5 wherein when the picture region does not have a desired aspect ratio, shadow box regions are used to adjust the picture region to fit in the corresponding frame.

7. A method of organizing retrieved images comprising:

displaying a sequence of fields, each field in the sequence of fields matching a corresponding image;

selecting the fields to display in the sequence of fields by selecting images from a template and moving the images to a carousel icon;

selecting a field in the sequence of fields;

displaying an image corresponding to the selected field;

moving the selected field to a different position to form a new ordering of fields; and reordering a sequence of images to generate a new image sequence, each image in the new image sequence sequenced in the same order as its corresponding field in the new ordering of fields.

8. The method of claim 7 further comprising the operations of:

retrieving a simulated slide sleeve including an associated search result;

selecting simulated slides from the simulated slide sleeve; and adding fields corresponding to the selected simulated slides to the new ordering of fields.

9. The method of organizing retrieved images of claim 7 further comprising:

using the reordered sequence of images to create a multimedia slide show.

* * * * *